United States Patent
Morrison et al.

(10) Patent No.: US 11,167,698 B2
(45) Date of Patent: Nov. 9, 2021

(54) VEHICLE HAVING AN ARTICULATED JOINT

(71) Applicant: ZF Friedrichshafen AG, Friedrichshafen (DE)

(72) Inventors: Robert Morrison, Tettnang (DE); Marcus Hiemer, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 104 days.

(21) Appl. No.: 16/497,449

(22) PCT Filed: Mar. 9, 2018

(86) PCT No.: PCT/EP2018/055859
§ 371 (c)(1),
(2) Date: Sep. 25, 2019

(87) PCT Pub. No.: WO2018/177719
PCT Pub. Date: Oct. 4, 2018

(65) Prior Publication Data
US 2021/0122298 A1    Apr. 29, 2021

(30) Foreign Application Priority Data

Mar. 27, 2017 (DE) ..................... 10 2017 205 114.0

(51) Int. Cl.
*B60R 11/00* (2006.01)
*H04N 13/239* (2018.01)
*H04N 7/18* (2006.01)

(52) U.S. Cl.
CPC ............... *B60R 11/00* (2013.01); *H04N 7/18* (2013.01); *H04N 13/239* (2018.05); *B60R 2011/004* (2013.01)

(58) Field of Classification Search
CPC . B60R 11/00; B60R 2011/004; H04N 13/239; H04N 7/18
USPC .......................................................... 348/47
See application file for complete search history.

(56) References Cited

U.S. PATENT DOCUMENTS

| | | | |
|---|---|---|---|
| 6,690,413 B1 | 2/2004 | Moore | |
| 6,923,080 B1* | 8/2005 | Dobler | B60R 1/00 348/E7.086 |
| 8,462,204 B2* | 6/2013 | Schofield | H04N 7/181 348/115 |
| 8,976,246 B1* | 3/2015 | Rappuhn | B60D 1/62 348/148 |
| 2004/0041942 A1* | 3/2004 | Jones | B60R 1/00 348/373 |
| 2006/0050149 A1 | 3/2006 | Lang et al. | |
| 2010/0025963 A1* | 2/2010 | Staude | B62D 53/0842 280/432 |

(Continued)

FOREIGN PATENT DOCUMENTS

| | | |
|---|---|---|
| DE | 10035223 A1 | 1/2002 |
| DE | 202005013989 U1 | 11/2005 |

(Continued)

*Primary Examiner* — Marnie A Matt
(74) *Attorney, Agent, or Firm* — Leydig, Voit & Mayer, Ltd.

(57) ABSTRACT

A vehicle comprising an articulated joint and a sensor arranged on the articulated joint and configured to detect a lateral area of the vehicle. The sensor is configured to be swiveled in order to change a sensed area.

11 Claims, 2 Drawing Sheets

(56) References Cited

U.S. PATENT DOCUMENTS

| | | | | |
|---|---|---|---|---|
| 2014/0309888 A1* | 10/2014 | Smit | ................ | B62D 13/06 |
| | | | | 701/41 |
| 2015/0002670 A1* | 1/2015 | Bajpai | ................ | B60R 1/00 |
| | | | | 348/148 |
| 2016/0229451 A1* | 8/2016 | Raad | ................ | B62D 13/06 |

FOREIGN PATENT DOCUMENTS

| | | | | |
|---|---|---|---|---|
| DE | 202004013984 U1 | 1/2006 | | |
| DE | 102006026898 A1 | 12/2007 | | |
| DE | 102007013501 A1 | 9/2008 | | |
| DE | 202013101083 U1 | 7/2013 | | |
| EP | 1245445 A2 | 10/2002 | | |
| GB | 2356612 A * | 5/2001 | ............ | B60R 1/025 |
| GB | 2356612 A | 5/2001 | | |

* cited by examiner

VEHICLE HAVING AN ARTICULATED JOINT

CROSS REFERENCE TO RELATED APPLICATIONS

This application is a U.S. National Stage Application under 35 U.S.C. § 371 of International Application No. PCT/EP2018/055859 filed on Mar. 9, 2018, and claims benefit to German Patent Application No. DE 10 2017 205 114.0 filed on Mar. 27, 2017. The International Application was published in German on Oct. 4, 2018 as WO 2018/177719 A1 under PCT Article 21(2).

FIELD

The invention relates to a vehicle with an articulated joint, and more particularly, to a vehicle with an articulated joint on which is arranged at least one sensor for detecting a lateral area of the vehicle.

BACKGROUND

Generic vehicles with an articulated joint are, for example, trucks with a semi-trailer, or dump trucks in an opencast mine, or articulated wheel loaders.

Sensors are often attached to this articulated vehicle in order to detect objects outside the vehicle.

DE 202013101083 U1 discloses an articulated vehicle in which a sensor is arranged in the front area of the driver's cab, which detects objects to the side of the vehicle. Such objects are displayed on a screen in the vehicle.

Since the sensor is attached to the driver's cab, the detected area changes depending on how the driver's cab of the vehicle changes relative to the semi-trailer.

SUMMARY

In an embodiment, the present invention provides a vehicle comprising an articulated joint and a sensor arranged on the articulated joint and configured to detect a lateral area of the vehicle. The sensor is configured to be swiveled in order to change a sensed area.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention relate to a vehicle having an articulated joint and from which objects can be reliably detected outside the vehicle.

According to embodiments of the invention, vehicles are provided with an articulated joint on which at least one sensor for detecting a lateral area of the vehicle is arranged. The sensor is located laterally or in the front area outside a driver's cab and is designed to swivel, wherein the swiveling of the sensor is a function of the angle of articulation of the driver's cab relative to the trailer or, in the case of a wheel loader, of the front end relative to the rear end. The sensor can be swiveled horizontally and/or vertically. It is also possible to swivel the sensor depending on the travel speed. When the vehicle is stationary, the sensor(s) can be swiveled in such a manner that, when several sensors are present in the front area of the driver's cab, the sensed driving areas do not overlap and, if the vehicle is no longer stationary but reaches a previously defined driving speed, the sensors or the sensor can be swiveled in such a manner that the sensed areas overlap. This makes it possible to detect an object in three dimensions. When the vehicle is stationary, it is not necessary to detect the object in three dimensions; it is instead sufficient to detect the object in two dimensions which makes it possible to manage without overlapping the detected areas.

Because the sensor is located on the driver's cab or in the front area of the vehicle and is designed to swivel, the sensor(s) can be swiveled in such a manner that the area required for such driving condition can be detected depending on the driving situation of the vehicle, for example, whether the vehicle is turning, or stationary, or traveling straight ahead.

Figure 1:
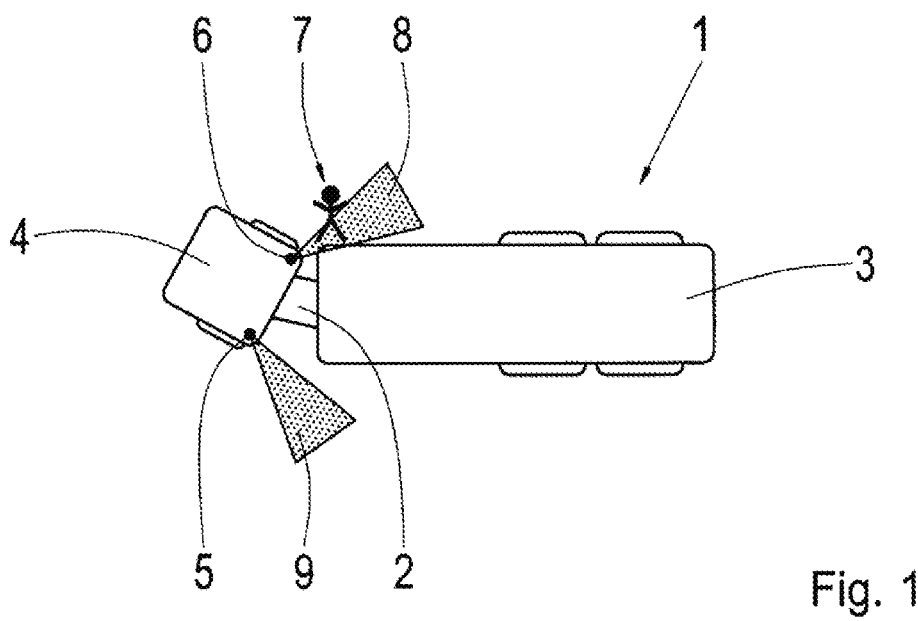
FIG. 1 illustrates a vehicle with an articulated joint that is in a steered state.

FIG. 1 illustrates a vehicle with an articulated joint that is in a steered state. The articulated vehicle 1 has an articulated joint 2 by means of which the trailer 3 can move relative to the driver's cab 4. If, for example, vehicle 1 is traveling in a curve, the angle of articulation of the articulated joint 2 changes. With a wheel loader, the trailer 3 is the rear end and the driver's cab 4 is the front end. A sensor 5 and a sensor 6 are located on the side of the driver's cab 4 or on the front end of a wheel loader, and they are designed to swivel. If the sensor 6 had not been designed to swivel, the object 7 would not be detected when the vehicle 1 is being steered, as shown in FIG. 1. However, by swiveling the sensor 6 depending on the angle of articulation of the articulated joint 2, the area 8 also changes, and the object 7 can also be detected when the vehicle 1 is in a steered state.

In an additional embodiment of the invention, the sensor 6 is not only swiveled depending on the angle of articulation of the articulated joint 2; rather, additional driving conditions can also influence the swivel angle of the sensor 6. Such influencing factors can be, for example, the driving speed or the gradient of the terrain.

Figure 2:
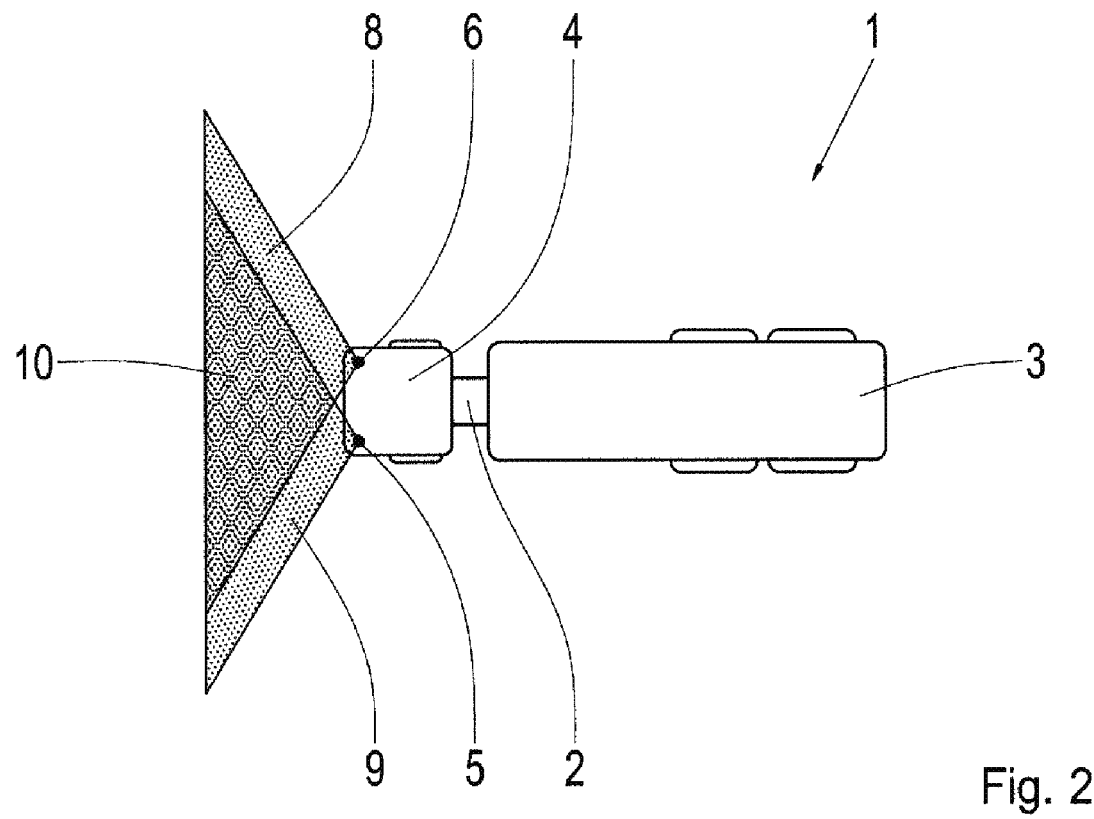
FIG. 2 illustrates a vehicle with an articulated joint moving straight ahead at a speed greater than zero.

FIG. 2 illustrates a vehicle with an articulated joint moving straight ahead at a speed greater than zero. The vehicle 1 has an articulated joint 2 which movably connects the trailer 3 to the driver's cab 4. With a wheel loader, the trailer 3 is the rear end, and the driver's cab 4 is the front end. Sensors 5 and 6 are located in the front area of driver's cab 4, either laterally at the front, for example on the outside mirror, or on outside on the front, for example on the fender. If the vehicle 1 drives at a previously defined speed, the sensors 5 and 6 or at least one of such sensors 5 or 6 are swiveled in such a manner that the detected areas 8 and 9 have at least one overlapping area 10. Given this overlapping area 10, an object can be detected in three dimensions. The sensors 5 and 6 are thus swiveled depending on the travel speed in such a manner that an overlapping area 10 arises.

Figure 3:
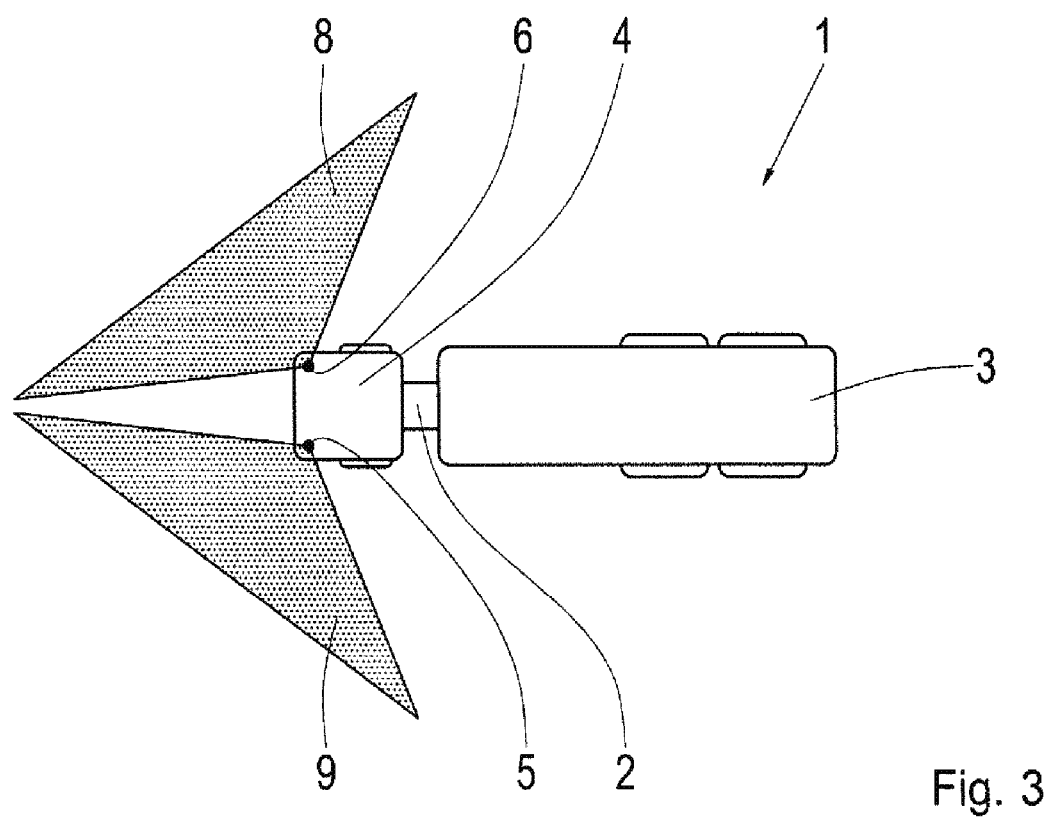
FIG. 3 illustrates a vehicle with an articulated joint that is at a standstill.

FIG. 3 illustrates a vehicle with an articulated joint that is at a standstill. The vehicle 1 of FIG. 3 corresponds to vehicle 1 of FIG. 2. The vehicle 1 in FIG. 3 is at a standstill, that is, at zero speed, and sensors 5 and 6 have been swiveled so that areas 8 and 9 do not overlap. This makes it possible to detect a two-dimensional image of an object and also to orient the detected area not only just to the front, but also to the side. Sensors 5 and 6 are thus swiveled when the vehicle is stationary such that a side area of the vehicle can also be detected.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Vehicle
2 Articulated joint
3 Trailer
4 Driver's cab
5 Sensor
6 Sensor
7 Object
8 Area
9 Area
10 Overlapping area

The invention claimed is:

1. A vehicle comprising:
a first vehicle unit;
a second vehicle unit,
an articulated joint configured to movably connect the first vehicle unit to the second vehicle unit;
a first sensor arranged on a front outer area of the vehicle and configured to detect a first sensed area, the first sensor being configured to be swiveled in order to adjust the first sensed area; and
a second sensor arranged on the front outer area of the vehicle and configured to detect a second sensed area, the second sensor being configured to be swiveled in order to adjust the second sensed area,
wherein the first sensor and the second sensor are configured to be swiveled based on a speed of travel of the vehicle,
wherein the first sensor and the second sensor are configured to be swiveled, in response to a driving speed of the vehicle exceeding a predefined speed greater than zero, such that the first sensed area and the second sensed area overlap to form an overlap area in which a three-dimensional image can be detected, and
wherein, in a stationary state of the vehicle, the first sensor and the second sensor are configured to be swiveled such that the first sensed area and the second sensed area do not overlap, as a result of which a two-dimensional image can be detected.

2. The vehicle according to claim 1, wherein at least one of the first sensor and the second sensor is configured to be swiveled based on an angle of articulation of the articulated joint.

3. The vehicle according to claim 1, wherein the first sensor is arranged on a first side of the vehicle and wherein the second sensor is arranged on a second side of the vehicle.

4. The vehicle according to claim 1, wherein the first vehicle unit is a driver's cab.

5. The vehicle according to claim 4, wherein the first sensor is located on a first side of a fender of the vehicle and the second sensor is located on a second side of the fender of the vehicle.

6. The vehicle according to claim 4, wherein the first sensor is located on a first outside mirror of the driver's cab and the second sensor is located on a second outside mirror of the driver's cab.

7. The vehicle according to claim 1, wherein the first sensor is configured to be swiveled so as to have a first orientation, the first orientation being determined based on a combination of (i) a vehicle speed and (ii) an angle of articulation of the articulated joint.

8. The vehicle according to claim 7, wherein the second sensor is configured to be swiveled so as to have a second orientation, the second orientation being determined based on a combination of (i) a vehicle speed and (ii) an angle of articulation of the articulated joint.

9. The vehicle according to claim 7, wherein the first orientation is additionally determined based on (iii) a gradient of terrain on which the vehicle is traveling.

10. The vehicle according to claim 9, wherein the second sensor is configured to be swiveled so as to have a second orientation, the second orientation being determined based on a combination of (i) the vehicle speed, (ii) the angle of articulation of the articulated joint, and (iii) the gradient of terrain on which the vehicle is traveling.

11. The vehicle according to claim 1, wherein in the stationary state of the vehicle, the first sensor is configured to be swiveled such that the first sensed area includes a first lateral area of the vehicle and the second sensed area includes a second lateral area of the vehicle.

* * * * *